April 26, 1966 H. KELCH 3,248,051

HEART CAM RESETTING DEVICES

Filed Sept. 11, 1963 5 Sheets-Sheet 1

INVENTOR
Heinz Kelch
by Michael J. Striker
Atty

April 26, 1966 H. KELCH 3,248,051

HEART CAM RESETTING DEVICES

Filed Sept. 11, 1963 5 Sheets-Sheet 2

INVENTOR

Heinz Kelch by Michael S. Striker

Attorney

April 26, 1966 H. KELCH 3,248,051

HEART CAM RESETTING DEVICES

Filed Sept. 11, 1963 5 Sheets-Sheet 3

INVENTOR
Heinz Kelch
by Michael J. Striker
Atty

HEART CAM RESETTING DEVICES

Filed Sept. 11, 1963 5 Sheets-Sheet 4

INVENTOR
Heinz Kelch
by Michael S. Striker
Atty

INVENTOR
Heinz Kelch
by Michael S. Striker
Atty

3,248,051
HEART CAM RESETTING DEVICES

Heinz Kelch, Villingen, Black Forest, Germany, assignor to Kienzle Apparate G.m.b.H., Black Forest, Germany Filed Sept. 11, 1963, Ser. No. 308,313
Claims priority, application Germany, Oct. 22, 1960, K 41,943; Feb. 4, 1961, K 42,818
15 Claims. (Cl. 235—144)

The present invention relates to heart cam resetting devices, and more particularly to an improvement of resetting devices of this type by which a malfunction in certain operational positions of the device is prevented.

The present application is a continuation-in-part application of my copending application Ser. No. 146,137 filed October 19, 1961 and entitled "Heart Cam Resetting Device."

It is known to use a heart cam for resetting a turnable member, such as a number wheel of a counter mechanism, to a zero position. A heart-shaped cam having a pointed extremity is secured to the number wheel, and a resetting lever is urged against the cam so that the number wheel is turned in one or the other direction to the zero position depending on which side of the pointed extremity the resetting lever engages the cam track. If the number wheel is, for example, in a position corresponding to the digit 0, it is only necessary to turn the number wheel through one digit position to the zero position, instead of turning the number wheel through nine digit positions. However, the heart cam and the number wheel may stop in a position in which the resetting lever engages the pointed extremity of the heart cam in a dead center position so that the resetting lever and the heart cam are blocked and do not turn at all.

It is one object of the present invention to provide improvements of heart cam resetting devices which assure function of the resetting device under all operational conditions.

Another object of the invention is to provide improvements of heart cam resetting devices by which the heart cam is reliably turned out of its dead center position when the resetting member is located opposite the pointed extremity of the heart cam so that the heart cam can be turned by the resetting member to a desired angular position.

Another object of the present invention is to provide a resetting arrangement which is so narrow that it can be aligned in the plane of the heart cam and fully utilizes the space available between the number wheels of a counter mechanism.

With these objects in view, the present invention relates to heart cam resetting devices particularly suited for a counter mechanism including several number wheels.

An apparatus according to the invention includes a turnable member, for example, a counter wheel, a heart cam connected to the counter wheel and having a cam track with a pointed extremity; resetting means movable to an operative position directly engaging said cam track and adapted to turn the cam with the turnable member when engaging the cam track outwardly of the pointed extremity; and means causing the cam to turn a small angle when the resetting means moves toward the heart cam along a path passing through the pointed extremity of the cam means.

If in such a dead center position, the resetting means engages the extremity it cannot turn the heart cam, but if the heart cam is displaced a small angle, the resetting means directly engages the cam track outwardly of the pointed extremity so that the turnable member, for example a counter wheel is turned to the desired position, such as the cleared zero position.

The turning of the heart cam out of the dead center position can be accomplished in different ways, and the present invention provides several embodiments in which a malfunction of the device by engagement of the heart cam in the dead center position is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1*a* and FIG. 1*b* are side elevations, partly in section illustrating two different operational positions of a resetting device according to one embodiment of the invention;

FIG. 2*a* and FIG. 2*b* are side elevations, partly in section, illustrating a modification of the embodiment shown in FIGS. 1*a* and 1*b*;

FIG. 3 is a fragmentary front view of the embodiment illustrated in FIGS. 1*a* and 1*b*;

FIG. 4*a*, FIG. 4*b*, FIG. 4*c*, FIG. 4*d*, and FIG. 4*e* are fragmentary schematic side views illustrating successive operational positions of the resetting device of FIGS. 1*a* and 1*b*;

FIG. 5*a*, FIG. 5*b*, FIG. 5*c*, and FIG. 5*d* are fragmentary side views, partly in section, illustrating successive operational positions of another embodiment of the invention;

Figure 8A:
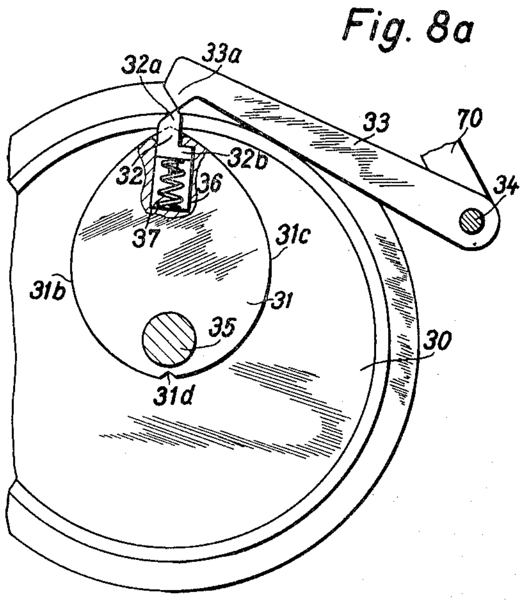
Figure 8B:
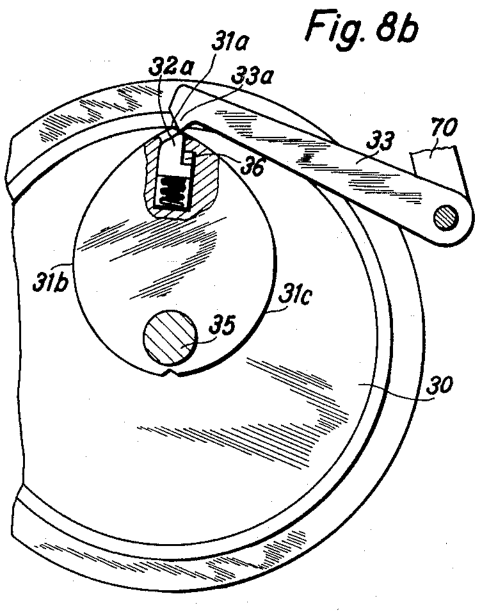
Figures 10A, 10B, 11A, 11B:
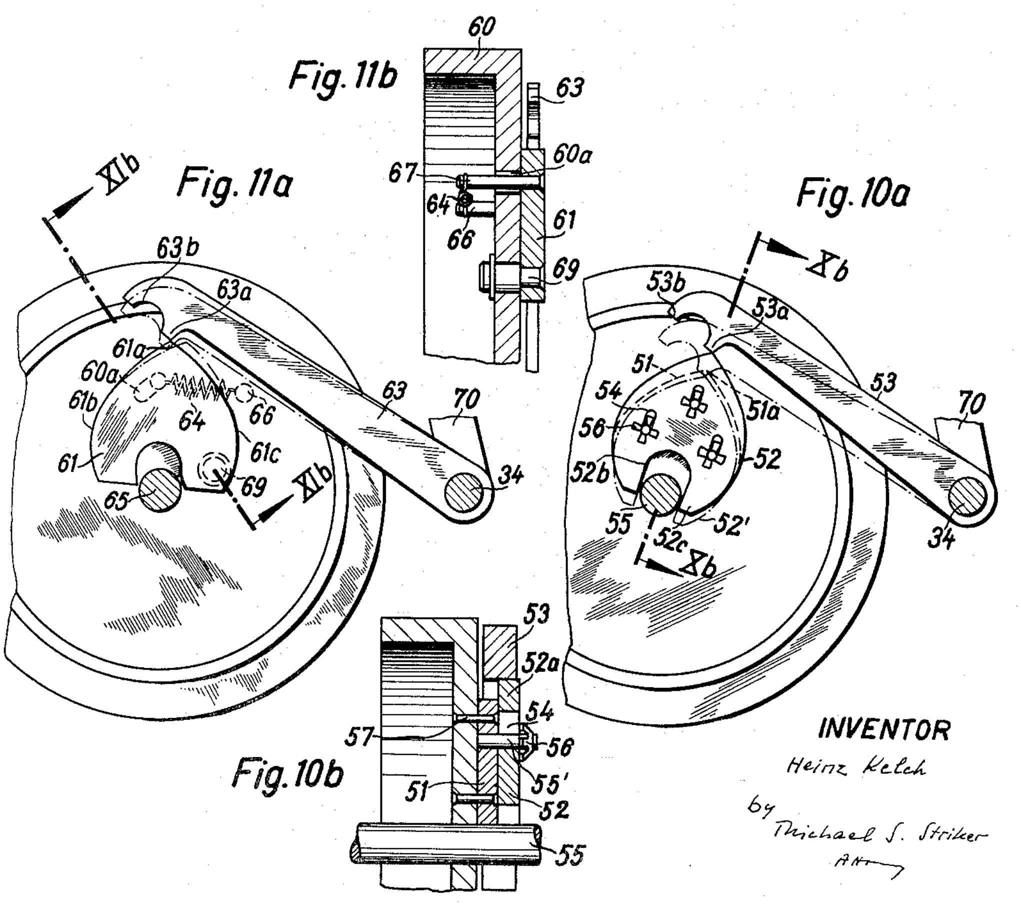
Figure 9B:
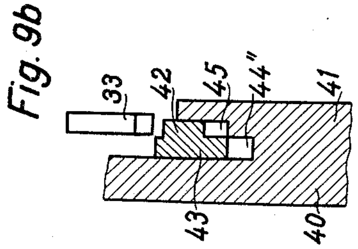
Figure 9A:
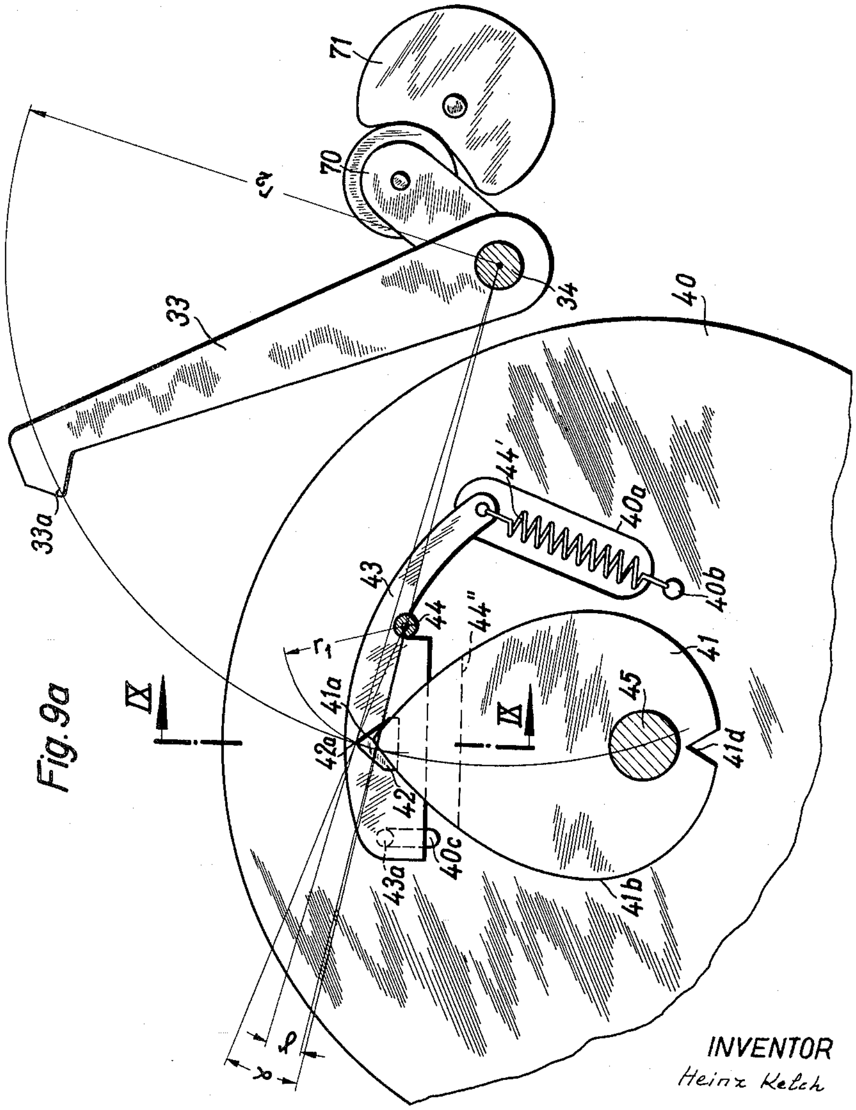

FIG. 8*a* and FIG. 8*b* are side elevations illustrating different operational positions of another embodiment of the invention;

FIG. 9*a* is a fragmentary side elevation illustrating another embodiment of the invention;

FIG. 9*b* is a fragmentary sectional view taken on line IX—IX in FIG. 9*a*;

FIG. 10*a* is a fragmentary side elevation illustrating another embodiment of the invention;

FIG. 10*b* is a fragmentary sectional view taken on line X—X in FIG. 10*a*;

FIG. 11*a* is a fragmentary side elevation illustrating a further embodiment of the invention; and FIG. 11*b* is a fragmentary sectional view taken on XI—XI in FIG. 11*a*.

Referring now to the drawings, and more particularly to FIGS. 1*a* to 3, the number wheels 1 are mounted on a common shaft 2 for turning movement and are driven by gears 1*a* and 1*b*. A heart cam 3 is secured to each number wheel 1 for turning movement. Each cam 3 has a holding projection 4 which is associated with the zero position of the number wheel 1, a pointed extremity **3*a*, and a symmetrical cam track including lateral cam track portions 3*b***.

Resetting levers 6 are mounted on an actuating shaft 7 for turning movement. Each lever 6 has an engaging portion 17 and a recessed portion 5 matching the holding projection 4 of cam 3. A stop pin 8 is secured to each resetting lever 6 and projects above the upper edge of control level 11. Another pin 10 is secured to control level 11, and since a coil spring 9 connects pins 8 and 10, control lever 11 is urged into the normal position illustrated in FIG. 1a and FIG. 2a in which it abuts stop pin 8.

A shaft 16 controls the resetting operation, and carries a fixed cam 15 cooperating with a cam follower roller 13 on the arm 12 which is provided on the first, or on the last, or on the first and on the last of the control levers 11 which all turn with the actuating shaft 7 when cam 15 operates the cam follower means 12, 13. A spring 14 is connected to arm 12 and urges roller 13 against the track of cam 15.

Figure 2A:
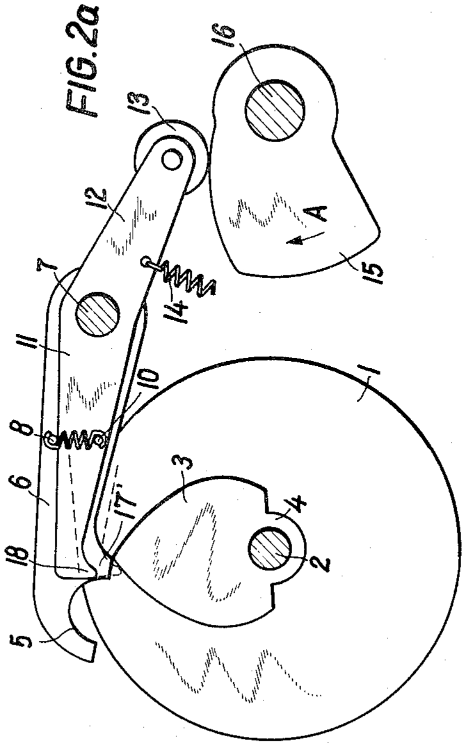
Figure 2B:
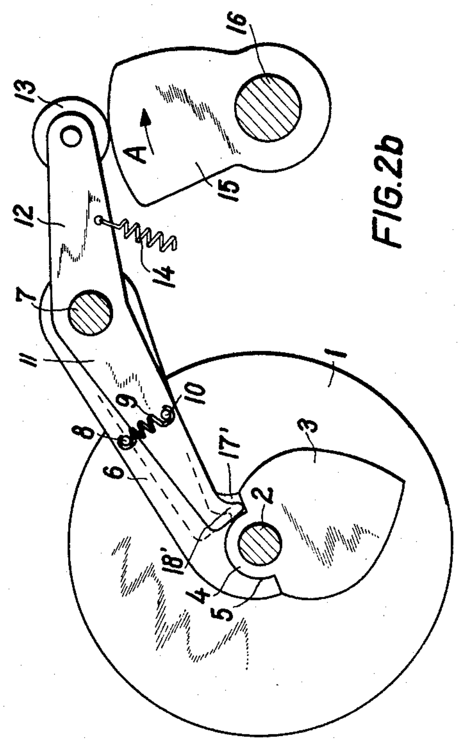
Figure 1A:
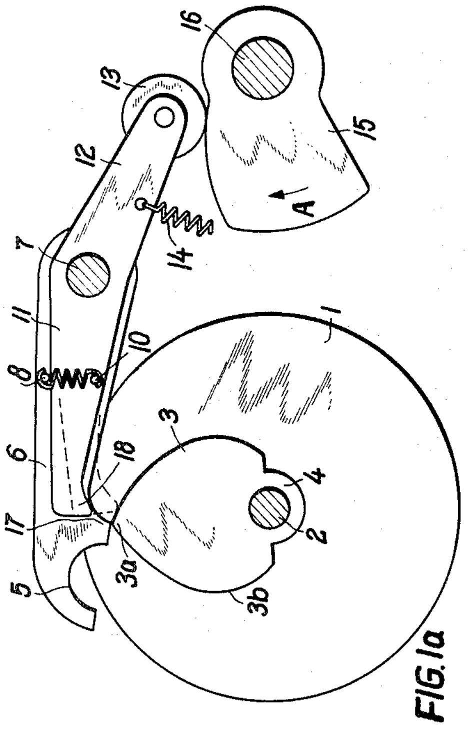
Figure 1B:
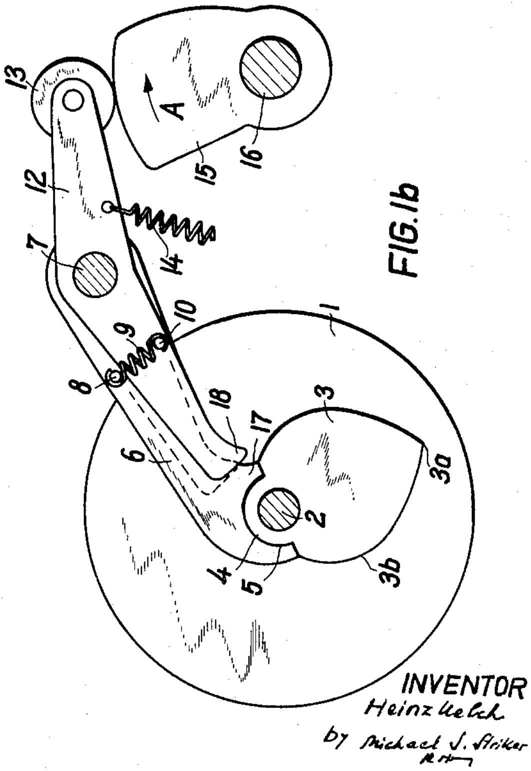

Cam 15 has a circular portion of small diameter and a projecting dwell portion. When cam follower roller 13 is located on the smaller circular cam portion of cam 15, spring 14 holds arm 12, shaft 7, and all control levers 11 in a position in which resetting levers 6 are in a raised position slightly spaced from the cam track of cam 3 while pins 8 abut control levers 11 due to springs 9. In this position, engaging portion 18 of control lever 11 is farther spaced from the cam track than engaging portion 17 of resetting lever 6. In the embodiment of FIGS. 1a and 1b, the control lever 11 is shorter, and engaging portion 18 is located closer to shaft 7 than engaging portion 17. In the embodiment of FIGS. 2a and 2b, control lever 11 is longer, and its engaging portions 18' is farther spaced from the axis of shaft 7 than portion 17'.

When shaft 16 turns to the position illustrated in FIGS. 1*a* and 2*a*, cam follower means 12, 13 are turned in counterclockwise direction, and turn shaft 7 with all control levers 11. Springs 9 are strong enough to pull all resetting levers 6 so that the same also turn in counterclockwise direction until the engaging portion 17, or 17' engages the cam track of cam 3. When engaging portion 17, or 17', engages one of the lateral cam track portions 3*b*, cam 3 will turn in one or the other direction until the position of FIG. 1*b* or FIG. 2*b* is obtained in which the recessed portion 5 engages the projecting portion 4 and locks cam 3 and number wheel 1 in the desired zero position.

A sequences of successive operational positions during turning of cam 3 in counterclockwise direction is shown in FIGS. 4*b* to 4*e*. When the position of FIG. 1*b* or FIG. 2*b* is reached and resetting lever 6 is blocked, control lever 11 turns relative to resetting levers 6 while spring 9 resiliently expands and pin 8 separates from lever 11. Further turning of cam 15 will permit cam follower means 12, 13 to turn in clockwise direction under the action of spring 14 so that cam 3 is released and number wheel 1 can again turn during a following operation of the counter.

Figures 4A, 4B, 4C, 4D, 4E:
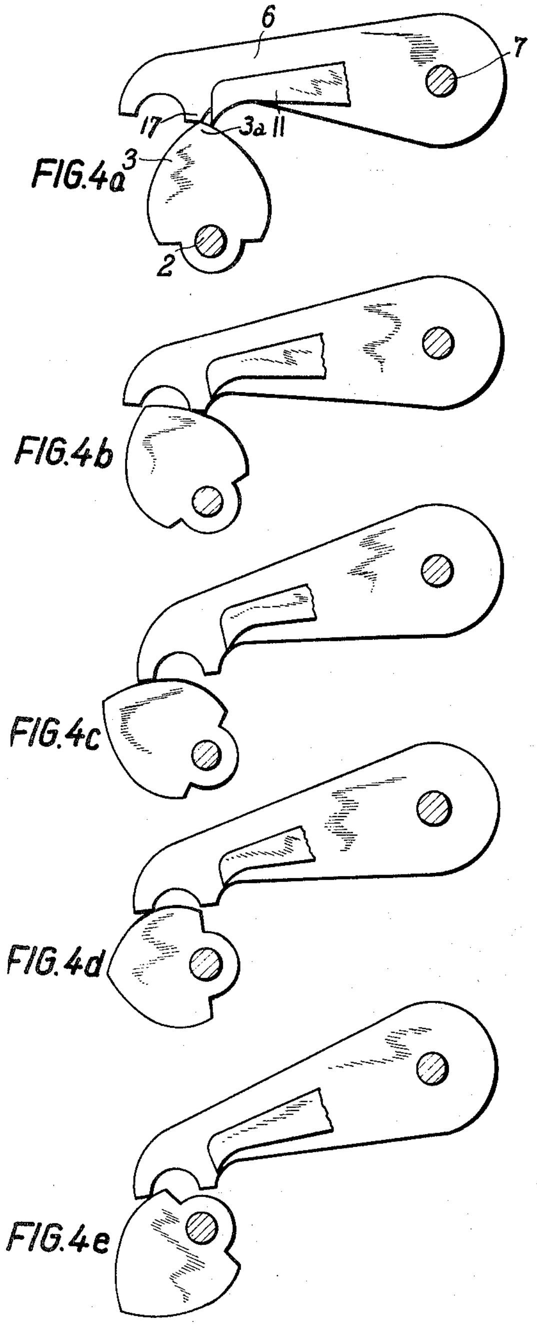

Assuming that cam 3 is in the dead center position shown in FIGS. 1*a*, 2*a* and 4*a*, the pressure of the resetting lever 6 will be incapable of turning cam 3 in either direction. The resetting lever 6 will be blocked, and consequently control lever 11 will turn in counterclockwise direction to the position illustrated in broken lines in FIGS. 1*a* and 2*a*, and in solid lines in FIG. 4*a*. The pressure exerted by the action of cam 15 on control lever 11 in this position will turn cam 3 slightly, since engaging portion 18, or 18', engages a lateral cam track portion 3*b* of cam 3. In the embodiment of FIG. 1*a*, as shown in FIG. 4*a* engaging portion 18 engages the right side of cam 3 and turns cam 3 in counterclockwise direction until the engaging portion 17 engages the right side of cam 3 on cam track portion 3*b* adjacent the pointed extremity 3*a*. Consequently, the pressure of resetting lever 6 acts on the respective cam track portion 3*b* so that cam 3 turns in counterclockwise direction first to the position shown in FIG. 4*b*, and then consequently to the positions shown in FIG. 4*c*, FIG. 4*d*, and FIGS. 4*e* and 1*b*.

In the embodiment of FIGS. 2*a* and 2*b*, the engaging portion 18' of the control lever 11 engages the left lateral cam track portion 3*b* in the dead center position of portion 17', and turns cam 3 in clockwise direction so that engaging portions 17' engages the left side of the cam and turns the cam further to the position shown in FIG. 2*b* in which control lever 11 performs a limited angular movement relative to resetting lever 6.

Figure 3:
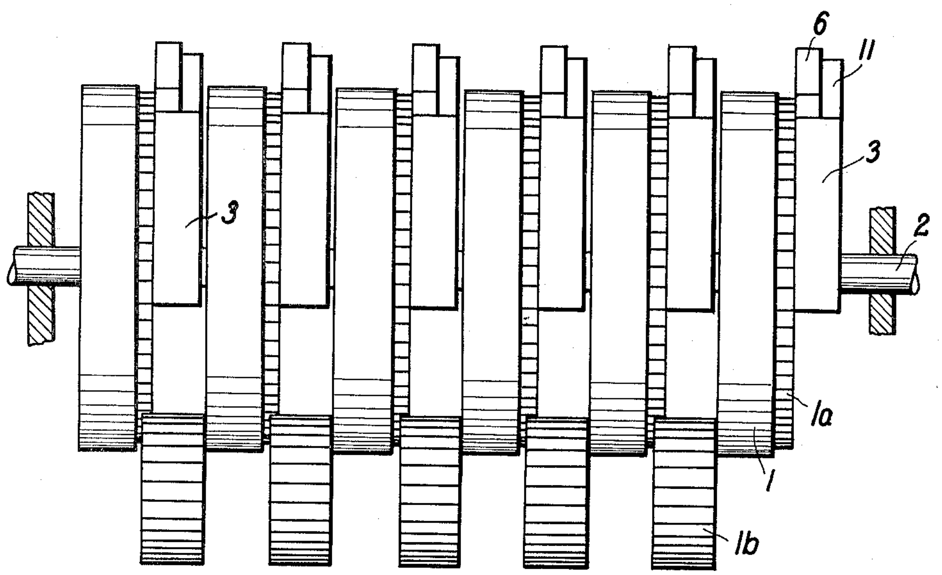

In the embodiment of FIGS. 1*a*, 1*b* and FIGS. 2*a*, 2*b*, levers 6 and 11 are mounted adjacent each other on shaft 7 with the engaging portions 17, 18 and 17', 18' located adjacent each other opposite the cam track so that cam 3 has an axial width corresponding to the sum of the axial widths of levers 6 and 11, as best seen in FIG. 3.

In the embodiment illustrated in FIGS. 5*a* to 7, the axial width of each cam 3 is reduced as compared with the above described embodiments. This is achieved by arranging the control lever 24 aligned in a common plane with control lever 25 and the cam track of cam 3. The number wheel 1, and the drive cam arrangement 15, 16, as well as cam follower means 12, 13 and the spring 14 are omitted in FIGS. 5*a* to 5*d*, but are constructed as described and illustrated with reference to FIGS. 1*a* and 1*b* to turn actuating shaft 23.

Figures 5A, 5B, 5C, 5D:
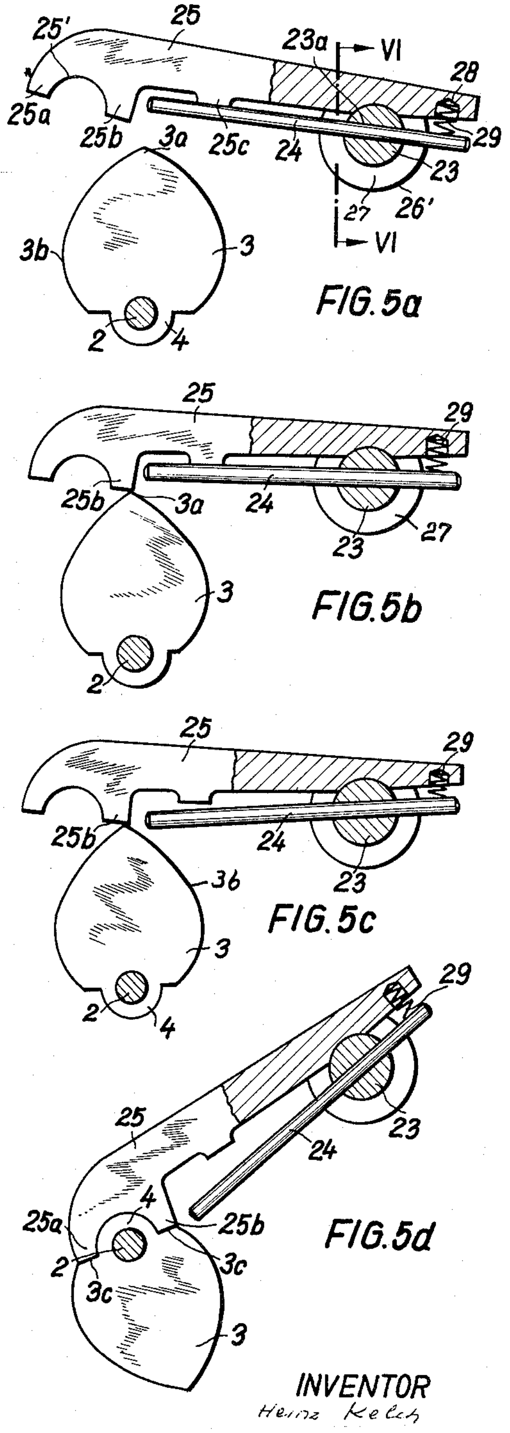
Figure 6:
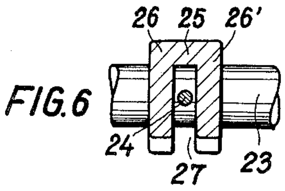
FIG. 6 is a cross sectional view taken on line VI—VI in FIG. 5*a*.

Referring now to FIG. 5*a*, actuating shaft 23 has transverse bores 23*a* in which control rod members 24 are fixed. Each resetting member 25 has a pair of bearing portions 26 and 26' which surround actuating shaft 23 and define between each other a gap 27 through which control rod 24 passes, as best seen in FIG. 6. One end of resetting lever 25 is formed with a recess 25' between a pair of projecting portions 25*a* and 25*b*, portion 25*b* being the engaging portion of resetting lever 25 and cooperating with cam 3. A third projecting portion 25*c* is engaged by control rod 24 under the action of a spring 29 which is seated in a recess 28 in the other end of resetting lever 25.

Due to the fact that the arm of resetting lever 25 is located between the bearing portions 26 and 26' and that control rod 24 extends between the bearings portions, control rod 24 can be aligned with the arm of resetting lever 25 and with the engaging portion 25*b* of the same.

The resetting device shown in FIGS. 5*a* to 5*d*, 6 and 7, operates in the manner described with reference to FIGS. 1*a* and 1*b*. If engaging portion 25*b* engages one of the cam track portions 3*b*, cam 3 will turn in one or the other direction to the position shown in FIG. 5*d* when cam 15 turns actuating shaft 23 through a cam follower, not shown in FIGS. 5*a* to 5*d*. In the position of FIG. 5*d*, control rod 24 will slightly turn relative to resetting lever 25 while spring 29 is compressed and lever 25 blocks number wheel 1 in the zero position.

In the event that the engaging portion 25*b* happens to engage the pointed extremity 3*a* of cam 3, as shown in FIG. 5*b*, cam 3 cannot be turned by resetting lever 5 out of this dead center position. However, further turning of actuating shaft 23 will now effect relative movement of control rod 24 relative to the blocked resetting lever 25 to the position shown in FIG. 5*c* in which the end of control rod 24 is about to engage a cam track portion 3*b*, and to turn cam 3 slightly in counterclockwise direction, so that engaging portion 25*b* is placed opposite the right cam track portion 3*b*, and further turns cam 3 in counterclockwise direction until the position of FIG. 5*d* is reached.

Figure 7:
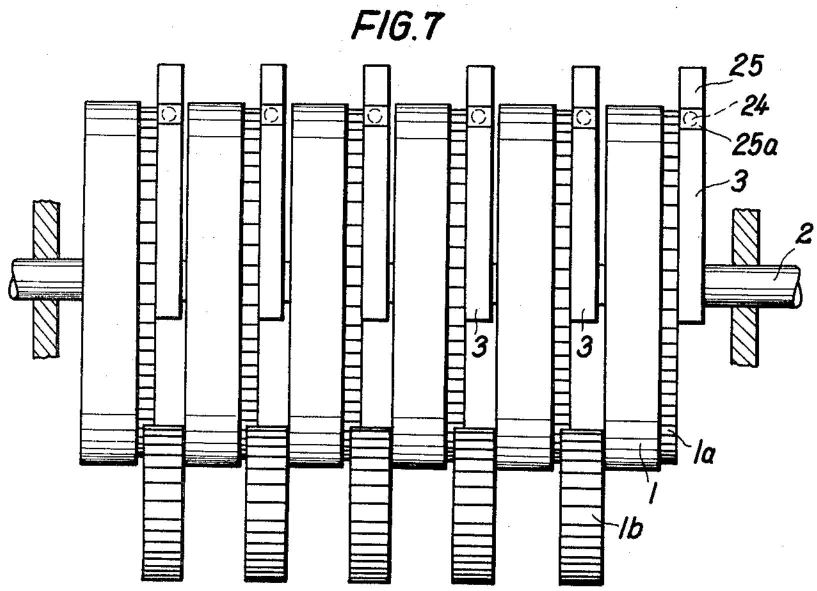
FIG. 7 is a fragmentary front elevation illustrating a counter mechanism with a resetting device according to the embodiment shown in FIG. 5*a*.

As best seen in FIG. 7, the cams 3 of the counter mechanism have an axial width corresponding to the axial width of the resetting lever 25, and consequently are narrower than the cams 3 in the embodiment of FIG. 3. Consequently, the total axial length of the counter mechanism is reduced, which is a considerable advantage.

In both embodiments of the invention, the projecting portions, for example the projecting portions 25*a* and 25*b* abut corresponding shoulders 3*c* on cam 3, as best seen in FIG. 5*d*. In this manner turning of cam 3 out of its zero position is impossible, particularly since due to the angular movement of control lever 24 or control lever 11 relative to resetting lever 25 or resetting lever 6, respectively, the resetting lever is urged by spring 9 or spring 29, respectively, against cam 3. In this manner, a positive locking of cam 3 and of number wheel 1 is accomplished as long as the dwell of cam 15 is effective.

Referring now to the embodiment shown in FIGS. 8*a* and 8*b*, a heart cam 31 is secured to a turnable number wheel 30 and mounted on a shaft 35. Cam 31 has a pointed extremity 31*a*, and two lateral cam tracks 31*b* and 31*c*. The resetting levers 33, of which only one is shown, are secured to an actuating shaft 34 having a cam follower 70, driven by an actuating cam 71, not shown, corresponding to cam 16 in FIG. 1*a*.

Resetting lever 33 has a pointed engaging portion 33*a* which cooperates with the cam track 31*b*, 31*c* of heart cam 31 to turn the same with the number wheel 30 to the desired zero position in which the engaging portion 33*a* engages the notch 31*d*.

Cam 31 has an undercut guide way 36 in which a control member 32 is mounted for movement in radial direction, corresponding to the direction of movement of engaging portion 33*a*. A spring 37 is mounted in the guide way and urges control member 32 to its normal outer position shown in FIG. 8*a*, in which a transverse projection 32*b* of control member 32 abuts a corresponding shoulder in recess 36.

Control member 32 has a pointed tip 32*a* and two lateral slanted cam faces. In the normal position of control member 32, the tip 32*a* is disposed laterally of the pointed extremity 31*a* of heart cam 31, and in the region of the cam track portion 31*c*, so that extremity 31*a* is located in the region of a left cam face of control member 32 as clearly shown in FIG. 8*a*. In the event that the engaging portion 33*a* moves toward the pointed extremity 31*a*, it first engages the lateral cam face of control member 32 and urges cam 31 to turn in clockwise direction so that engaging portion 33*a* sliding on the lateral cam face of control member 32 reaches cam track portion 31*b* and further turns heart cam 31 with number wheel 32 to the zero position.

In the event that the turnable wheel 30 is located in the position shown in FIG. 8*a*, an engagement between the engaging portions 33*a* and 32*a* will take place. Control member 32 will be inwardly displaced against the action of spring 37 until the tip 32*a* is flush with the cam track portion 31*c*, whereby engaging portion 33*a* is brought into engagement with the cam track of heart cam 31 and exerts pressure to turn the same while spring 37 returns control member 32 to its normal position. FIG. 8*b* shows the control member 32 in the displaced position in which engaging portion 33*a* not only engages the tip 32*a* but also lateral cam track portion 31*c* of cam 31.

The embodiment illustrated in FIGS. 9*a* and 9*b* also provides a control member 42 which has a pointed tip 42*a* and two lateral cam faces. Control member 42 is mounted on a lever 43 which is turnable about a pivot pin 44 secured to the turnable member 40, such as a number wheel. One end of lever 43 carries a guide pin 43*a* which moves in a slot 40*c* of turnable member 40 when lever 43 turns about pivot pin 44.

A spring 44′ secured in a hole 40*b* of turnable member 40 is also secured to the other end of lever 43 and holds lever 43 in the position illustrated in FIG. 9*a* in which stop pin 43*a* abuts the upper end of slot 40*c*.

In this normal position of lever 43, control member 42 is in its normal position, illustrated in FIG. 9*a* with its tip 42*a* located in the region of the cam track portion 41*b*, and one of its lateral cam faces located in the region of the pointed extremity 41*a* of heart cam 41.

The resetting lever 33 has a pointed engaging portion 33*a*, and is turned by an actuating shaft 34, as described above. The pointed tip of engaging portion 33*a* moves along a circular path having the radius $r^2$. In the position shown in FIG. 9*a*, control member 42 happens to be in a position in which engaging portion 33*a* will engage the tip 42*a* of the control member.

A groove 44″ is provided in cam 41 adjacent turnable member 40 to receive lever 43, and another groove 45 of lesser depth is provided to receive control member 42 when members 43 and 42 are displaced from the normal illustrated position.

When engaging portion 33*a* engages the tip 42*a* of control member 42, lever 43 pivots about pivot pin 44 while spring 44′ is tensioned. Control member 42 is pressed into a displaced position in which its tip 42*a* is flush with the cam track portion 41*b* so that engaging portion 33*a* engages cam track portion 41*b* and turns cam 41 with number wheel 40 in clockwise direction to the desired zero position in which engaging portion 33*a* engages recess 41*d*. As soon as the pressure of resetting member 33 acts no longer on control member 42 but on the heart cam, spring 44′ turns lever 43 back to its normal position in which control member 42 projects beyond the extremity 41*a* of cam 41. Engaging portion 33*a* moves through the angle $\gamma$ until reaching cam track 41*b*, while the tip 42*a* of control member 42 moves through the angle $\alpha$.

Due to the fact that control member 42 can move substantially in the direction of the engaging portion 33*a* of resetting member 33, but cannot move in the transverse direction in which the pointed extremity 41*a* moves during turning of cam 41, pressure on a cam face of control member 42 will cause turning movement of cam 41 in the same manner as described with reference to the embodiment of FIGS. 8*a* and 8*b*, where the guide way 36 prevents a transverse movement of control member 32 relative to cam 31.

The embodiment illustrated in FIGS. 10*a* and 10*b* is based on the same principle. A heart cam 51 is secured by rivets 57 to the turnable member 50, which may be a number wheel. Cam 51 cooperates with a resetting member 53 which turns with an actuating shaft 34, as described above with reference to other embodiments. The engaging portion 53*a* is formed with a part-circular recess 53*b* whose shape corresponds to the shape of shaft 51.

A heart-shaped control member 52 is mounted on heart cam 51 shiftable in substantially radial direction corresponding to the direction of movement of the engaging portion 53*a* of resetting member 53. In the illustrated embodiment, three studs 55′ are fixed to heart cam 51 and project through elongated slots 54 in heart-shaped control member 52. Dished springs 56 are secured to studs 55′ and resiliently engage heart-shaped control member 52 so that the same tends to remain in any position relative to heart cam 51, but can be displaced against the friction force of spring means 56.

The normal position of the heart-shaped control member 52 is shown in the drawing and it will be seen that the tip 52*a* projects beyond the pointed extremity 51*a* of heart cam 51, and is located in the region of one of the cam track portions of heart cam 51.

Control member 52 has a cutout or guide way 52*b* receiving shaft 55.

When engaging portion 53*a* of resetting member 53 engages the tip 52*a* of the heart-shaped control member 52, the same is displaced and assumes the position 52′ shown in dash-and-dot lines. In this position, engaging portion 53*a* abuts the left cam track portion of heart cam 51 which is illustrated in FIG. 10*a* in broken lines and covered by heart-shaped control member 52.

Further movement of resetting member causes turning of heart cam 51 with number wheel 50 until the shoulders of resetting member 53 adjacent recess 53*b* engage corresponding shoulders 52*c* of the displaced control member 52 and shift the same back to its normal position illustrated in solid lines, while recess 53*b* abuts shaft 55. The number wheel is now in the desired zero position, and resetting lever 53 is automatically retracted by cam means, not shown.

The embodiment illustrated in FIGS. 11*a* and 11*b* achieves the displacement of heart cam 61 out of its dead center position without a specific control member.

Number wheels 60 are mounted on a shaft 65, and each number wheel carries a heart cam 61. In contrast to the above-described embodiments of the invention, heart cam 61 is not fixedly secured to the corresponding number wheel 60, but is mounted on a pivot means 69 for turning movement about an axis, which is parallel to the axis of shaft 65 and eccentric with respect to the same. The heart cam 61 has a curved cut-out 61' through which shaft 65 passes so that heart cam 61 can perform a turning movement relative to number wheel 60 about pivot means 69. A spring 64 is secured to a stop pin 67 on heart cam 61 and to a pin 66 on the wall of number wheel 60 and urges heart cam 61 to turn in clockwise direction as viewed in FIG. 11*a*. Stop pin 67 projects through a corresponding slot 60*a* in number wheel 60 so that the turning movement of heart cam 61 is limited to a small angle.

In the event that engaging portion 63*a* happens to be in a position in which it engages the pointed extremity 61a of heart cam 61, heart cam 61 turns in counterclockwise direction about pivot 69 against the action of spring 64 until stop pin 67 engages the other end of slot 60*a*.

Due to the angular displacement of cam 61, spring 64 is tensioned and when stop pin 67 reaches the other end of slot 60*a*, engaging portion 63*a* slides off the pointed extremity 61*a* and engages the cam track of heart cam 61.

When the position of the number wheel 60 is such that engaging portion 63*a* engages the lateral cam track portion 61*c* directly, the force of spring 64 is sufficient to maintain the position of the heart cam so that the heart cam turns the number wheel to the desired zero position in which recess 63*b* engages shaft 65.

It will be understood that each of the elements described above or two or more together, may also find a useful application in other types of resetting devices differing from the types described above.

While the invention has been illustrated and described as embodied in a heart cam resetting device including means for turning the heart cam out of its dead center position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A resetting device comprising in combination a turnable means turnable about an axis in opposite directions to a desired angular position and including a cam member connected to said turnable means for turning movement therewith and having a cam track with a pointed extremity; a resetting means having a rigid portion movable along a predetermined path to an operative position directly engaging said cam track and adapted to turn said cam member with said turnable means when directly engaging said cam track at a portion other than said pointed extremity thereof; an actuating arrangement for actuating said resetting means tending to move the same into said operative position; and an adjusting arrangement for moving said turnable means from a first position in which said pointed extremity of said cam member is located in said predetermined path of said rigid portion of said resetting means into a second position in which another portion of said cam track other than said pointed extremity is located in said predetermined path, said adjusting arrangement including an adjusting element movably connected for relative movement to one of said means and engaging the other of said means when said cam member is in said first position during actuation of said resetting means by said actuating arrangement and arranged to be moved by said actuation into a position exerting a turning force on said turnable means.

2. A resetting device comprising in combination a turnable means turnable about an axis in opposite directions to a desired angular position and including a cam member connected to said turnable means for turning movement therewith and having a cam track with a pointed extremity; a resetting means having a rigid portion movable along a predetermined path to an operative position directly engaging said cam track and adapted to turn said cam member with said turnable means when directly engaging said cam track at a portion other than said pointed extremity thereof; an actuating arrangement for actuating said resetting means tending to move the same into said operative position; and an adjusting arrangement for moving said turnable means from a first position in which said pointed extremity of said cam member is located in said predetermined path of said rigid portion of said resetting means into a second position in which another portion of said cam track other than said pointed extremity is located in said predetermined path, said adjusting arrangement including an adjusting element resiliently connected to one of said means and engaging the other of said means when said cam member is in said first position during actuation of said resetting means by said actuating arrangement and arranged to be moved by said actuation into a position exerting a turning force on said turnable means.

3. A resetting device comprising, in combination, a turnable member turnable about an axis in opposite directions to a desired angular position; cam means connected to said turnable member for turning movement and having a cam track with a pointed extremity moving in a first direction; resetting means having a rigid portion movable in a second direction transverse to said first direction to an operative position directly engaging said cam track and adapted to turn said cam means with said turnable member when directly engaging said cam track outwardly of said pointed extremity; and a rigid spring-loaded control member mounted on one of said means for movement in said second direction and non-movable in said first direction and engaging the other of said means when said resetting means moves along a path passing through said pointed extremity of said cam means for causing turning movement of said cam means through a small angle so that said resetting means then directly engages said cam track outwardly of said pointed extremity for turning said cam means with said turnable member to said desired position; and means for actuating said resetting means to move to and from said operative position.

4. A resetting device comprising, in combination, a turnable member turnable about an axis in opposite directions to a desired angular position; cam means connected to said turnable member for turning movement and having a cam track with a pointed extremity; resetting means having a rigid portion movable to an operative position directly engaging said cam track and adapted to turn said cam means with said turnable member when directly engaging said cam track outwardly of said pointed extremity; and control means operatively connecting said resetting means with said cam means for turning said cam means a small angle when said resetting means moves along a path passing through said poined extremity of said cam means, said control means including a control member having lateral cam faces and a tip between said cam faces and being mounted in a normal position in which one of said lateral cam faces is located in the region of said pointed extremity and said tip is located in the region of said cam track laterally of said pointed extremity, said control member being movable to a displaced position in which said tip registers with said cam track laterally of said extremity whereby said resetting means when engaging said tip displaces said control member and then directly engages said cam track outwardly of said pointed extremity or directly engages said one lateral cam face instead of said extremity and turns said cam means until engaging said cam track for further turning said cam means with said turnable member to said desired position; and means for actuating said resetting means to move to and from said operative position.

5. A resetting device comprising, in combination, a turnable member turnable about an axis in opposite directions to a desired angular position; cam means connected to said turnable member for turning movement and having a cam track with a poined extremity; resetting means having a rigid portion movable to an operative position directly engagind said cam track and adapted to turn said cam means with said turnable member when directly engaging said cam track outwardly of said pointed extremity; and control means operatively connecting said resetting means with said cam means for turning said cam means a small angle when said resetting means moves along a path passing through said pointed extremity of said cam means, said conrol means including a control member having lateral cam faces and a tip between said cam faces and being mounted on said cam means for movement in radial direction and non-turnable relative to said cam means and having a normal position in which one of said lateral cam faces is located in the region of said pointed extremity and said tip is located in the region of said cam track laterally of said pointed extremity, said control member being movable to a displaced position in which said tip registers with said cam track laterally of said extremity whereby said resetting means when engaging said tip displaces said control member and then directly engages said cam track outwardly of said pointed extremity or directly engages said one lateral cam face instead of said extremity and turns said cam means until engaging said cam track for further turning said cam means with said turnable member to said desired position; and means for actuating said resetting means to move to and from said operative position.

6. A resetting device comprising, in combination, a turnable member turnable about an axis in opposite directions to a desired angular position; cam means connected to said turnable member for turning movement and having a cam track with a pointed extremity; resetting means having a rigid portion movable to an operative position directly engaging said cam track and adapted to turn said cam means with said turnable member when directly engaging said cam track outwardly of said pointed extremity; and control means operatively connecting said resetting means with said cam means for turning said cam means a small angle when said resetting means moves along a path passing through said pointed extremity of said cam means, said control means including a heart-shaped control member having lateral cam faces and a tip between said cam faces, and means for mounting said heart-shaped control member on said cam means for movement in radial direction and non-turnable relative to the same, said heart-shaped cam means having a normal position in which one of said lateral cam faces is located in the region of said pointed extremity and said tip is located in the region of said cam track laterally of said pointed extremity, said control member being movable to a displaced position in which said tip registers with said cam track laterally of said pointed extremity whereby said resetting means when engaging said tip displaces said control member and then directly engages said cam track outwardly of said pointed extremity or directly engages said one lateral cam face instead of said extremity and turns said cam means until engaging said cam track for further turning said cam means with said turnable member to said desired position, said resetting means shifting said heart-shaped control member in said desired position of said turnable member from said displaced position to said normal position; and means for actuating said resetting means to move to and from said operative position.

7. A resetting device as set forth in claim 6 wherein said mounting means include studs secured to said cam means, wherein said heart-shaped control member has slots receiving said studs, and spring means mounted on said studs and frictionally engaging said control member for holding the same in said normal position and in a radially displaced position.

8. A resetting device comprising, in combination, a turnable member turnable about an axis in opposite directions to a desired angular position; cam means connected to said turnable member for turning movement and having a cam track with a pointed extremity; resetting means having a rigid portion movable to an operative position directly engaging said cam track and adapted to turn said cam means with said turnable member when directly engaging said cam track outwardly of said pointed extremity; and control means operatively connecting said resetting means with said cam means for turning said cam means a small angle when said resetting means moves along a path passing through said pointed extremity of said cam means, said control means including a lever mounted on said turnable member for turning movement, spring means urging said lever to turn in one direction, stop means limiting turning movement of said lever in a normal position, and a control member mounted on said lever and having lateral cam faces and a tip between said cam faces, one of said lateral cam faces being located in the region of said pointed extremity and said tip being located in the region of said cam track laterally of said pointed extremity in said normal position, said control member being movable with said lever against the action of said spring means to a displaced position in which said tip registers with said cam track laterally of said extremity whereby said resetting means when engaging said tip displaces said control member and directly engages said cam track outwardly of said pointed extremity, or directly engages said one lateral cam face instead of said extremity and turns said cam means until engaging said cam track for further turning said cam means with said turnable member to said desired position and means for actuating said resetting means to move to and from said operative position.

9. A resetting device comprising, in combination, a turnable member turnable in opposite directions to a desired angular position; a cam connected to said turnable member for turning movement and having a cam track with a pointed extremity; a resetting member having a rigid portion movable to an operative position directly engaging said cam track; a control member movable to a position engaging said cam track; resilient means connecting said control member with said resetting member; and actuating means operating said control member for actuating said resetting member so that said resetting member is moved through said resilient means to said operative position thereof to turn said cam to a position in which said turnable member is in said desired position, said control member moving relative to said resetting member when said resetting member directly engages said extremity in a dead center position and is blocked so that said control member then engages said cam and turns the same until said resetting member directly engages another cam track portion and turns said cam with said turnable member to said desired position.

10. A resetting device comprising, in combination, a turnable member turnable in opposite directions to a desired angular position; a cam connected to said turnable member for turning movement and having a cam track with a pointed extremity; a resetting member having a rigid engaging portion and being movable to an operative position in which said engaging portion directly engages said cam track; a control member having an engaging portion and being movable to a position in which said engaging portion thereof engages said cam track, said engaging portions being spaced from each other in the direction of said cam track; resilient means connecting said control member with said resetting member; actuating means for operating said control member so that said resetting member is moved through said resilient means to said operative position thereof to turn said cam to a position in which said turnable member is in said desired position, said control member moving relative to said resetting member when said resetting member directly engages said extremity in a dead center position and is blocked so that said engaging portion of said control member then engages said cam and turns the same until said engaging portion of said resetting member directly engages another cam track portion and turns said cam with said turnable member to said desired position.

11. A resetting device comprising, in combination, a turnable number wheel member turnable in opposite directions to a desired angular zero position; a cam connected to said turnable number wheel member for turning movement and having a cam track with a pointed extremity and with a holding portion spaced from said extremity; an actuating shaft; a resetting member having a rigid engaging portion and being mounted for turning movement on said actuating shaft to an operative position in which said engaging portion directly engages said cam track; a control member having an engaging portion and being secured to said actuating shaft for angular movement with the same to a position in which said engaging portion thereof engages said cam track, said engaging portions being spaced from each other in the direction of said cam track; resilient means connecting said control member with said resetting member; said actuating shaft operating said control member so that said resetting member is moved through said resilient means to said operative position thereof to turn said cam until engaging said holding portion of said cam track in a position in which said turnable member wheel member is in said desired position, said control member moving relative to said resetting member when said engaging portion of said resetting member directly engages said extremity in a dead center position and is blocked so that said engaging portion of said control member then engages said cam and turns the same until said engaging portion of said resetting member directly engages another cam track portion and turns said cam with said turnable number wheel member to said desired position.

12. A device as set forth in claim 11 wherein said cam has a projecting holding portion spaced 180° from said extremity; wherein said resetting member is a lever having a transversely projecting stop pin and a recessed portion matching said holding portion for holding said cam in a position in which said number wheel member is in said zero position; wherein said control member is a control lever adjacent said resetting lever and having a transverse pin; and wherein said resilient means is a coil spring connected to said pins and urging said control lever to said normal position abutting said stop pin.

13. A resetting device comprising, in combination, a turnable number wheel member turnable in opposite directions to a desired angular zero position; a cam connected to said turnable number wheel member for turning movement and having a cam track with a pointed extremity and with a holding portion spaced from said extremity; an actuating shaft; a resetting member having a rigid engaging portion and being mounted for turning movement on said actuating shaft to an operative position in which said engaging portion directly engages said cam track; a control member having an engaging portion and being secured to said actuating shaft; for angular movement with the same to a position in which said engaging portion thereof engages said cam track, said engaging portions being spaced from each other in the direction of said cam track; resilient means connecting said control member with said resetting member; cam follower means connected to said actuating shaft, and an actuating cam means for operating said cam follower means to turn said actuating shaft and said control member to perform an angular motion so that said resetting member is moved through said resilient means to said operative position thereof to turn said cam until directly engaging said holding portion of said cam track in a position in which said turnable number wheel member is in said desired position, said control member moving relative to said resetting member when said engaging portion of said resetting member directly engages said extremity in a dead center position and is blocked so that said engaging portion of said control member then engages said cam and turns the same until said engaging portion of said resetting member directly engages another cam track portion and turns said cam with said turnable number wheel member to said desired position.

14. A resetting device comprising, in combination, a turnable number wheel member turnable in opposite directions to a desired angular zero position; a cam connected to said turnable number wheel member for turning movement and having a cam track with a pointed extremity and with a holding portion spaced from said extremity; a resetting member having a rigid engaging portion and being movable to an operative position in which said engaging portion directly engages said cam track; a control member having an engaging portion and being movable to a position in which said engaging portion thereof engages said cam track, said control member being located between a portion of said resetting member and said cam track and aligned in a common plane passing through said cam track; resilient means connecting said control member with said resetting member and holding said control member in a normal position in which said engaging portion of said control member is farther spaced from said cam track than said engaging portion of said resetting member; actuating means for actuating said control member so that said resetting member is moved through said resilient means to said operative position thereof to turn said cam until engaging said holding portion of said cam track in a position in which said turnable number wheel member is in said desired position, said control member moving relative to said resetting member when said engaging portion of said resetting member directly engages said extremity in a dead center position and is blocked so that said engaging portion of said control member then engages said cam and turns the same until said engaging portion of said resetting member directly engages another cam track portion and turns said cam with said turnable number wheel member to said desired position.

15. A device as set forth in claim 14 wherein said resetting member is a lever having said engaging portion at one end and a projection spaced a short distance therefrom; wherein said control member is a rod abutting said projection in said normal position and being biassed by said resilient means to move to said normal position; and wherein said resetting lever and said rod are mounted for relative turning movement about a common axis.

References Cited by the Examiner

UNITED STATES PATENTS

| | | | |
|---|---|---|---|
| 670,075 | 3/1901 | Heinitz | 235—144 |
| 2,739,736 | 3/1956 | Bliss | 235—144 |
| 3,054,531 | 9/1962 | Carriol | 235—144 |

FOREIGN PATENTS

| | | |
|---|---|---|
| 709,123 | 8/1941 | Germany. |

LEO SMILOW, *Primary Examiner.*

LEYLAND M. MARTIN, *Examiner.*